United States Patent [19]

Sekine

[11] Patent Number: 5,012,613
[45] Date of Patent: May 7, 1991

[54] POWER WINDOW APPARATUS

[75] Inventor: Shuji Sekine, Yokohama, Japan

[73] Assignee: Jidosha Denki Kogyo K.K., Kanagawa, Japan

[21] Appl. No.: 481,401

[22] Filed: Feb. 20, 1990

[30] Foreign Application Priority Data

Feb. 22, 1989 [JP] Japan ............... 1-20061[U]

[51] Int. Cl.⁵ ........................................... E05F 11/40
[52] U.S. Cl. ........................................ 49/362; 49/349
[58] Field of Search .................... 49/362, 349, 352

[56] References Cited

U.S. PATENT DOCUMENTS

| | | | |
|---|---|---|---|
| 2,160,099 | 5/1939 | Zeligman et al. | 49/362 |
| 2,311,972 | 2/1943 | Simpson | 49/349 |
| 2,649,300 | 8/1953 | Launder | 49/349 |
| 2,914,315 | 11/1959 | Wise | 49/349 |
| 3,014,715 | 12/1961 | Martens | 49/349 |
| 3,204,170 | 8/1965 | Monks | 49/362 |
| 3,706,163 | 12/1972 | Pickles | 49/362 |
| 3,736,702 | 6/1973 | Pickles | 49/362 |
| 4,074,463 | 2/1978 | Colanzi | 49/349 X |
| 4,167,834 | 9/1979 | Pickles | 49/362 X |
| 4,182,078 | 1/1980 | Bartholomew | 249/362 X |
| 4,433,508 | 2/1984 | Carletta | 49/362 X |
| 4,788,795 | 12/1988 | Pinsonneault | 49/362 X |
| 4,852,422 | 8/1989 | Mori | 49/362 X |

Primary Examiner—Gary L. Smith
Assistant Examiner—Michael J. Milano
Attorney, Agent, or Firm—Sughrue, Mion, Zinn, Macpeak & Seas

[57] ABSTRACT

A power window apparatus for opening and closing a curved window glass having a comparatively large curvature in the direction of its curvature is provided with a fixedly mounted reversible motor, a curved screw having curvature nearly equal to the curvature of the curved window glass and fixed in parallel to the curved window glass, and a movable unit fitted onto said curved screw and connected to the motor and said curved window glass. A flexible drive shaft transmits the rotation of the motor to a worm gear in mesh with a worm wheel disposed in threaded connection on the curved screw to move the movable unit along the length of the screw.

2 Claims, 3 Drawing Sheets

POWER WINDOW APPARATUS

BACKGROUND OF THE INVENTION

1. Field of the Invention

This invention relates to a power window apparatus used for opening and closing a window glass of, for example, an automobile, a gymnasium, a sunroom, and so on, and more particularly to a power window apparatus used for opening and closing a curved window glass along curvature of the curved window glass.

2. Description of the Prior Art

Heretofore, there has been used a power window apparatus of this type as shown in FIG. 3, for example.

A power window apparatus 51 shown in this FIGURE which is used for opening and closing a window glass 52 of an automobile automatically, is provided on the inside of a door panel 58 with a motor 53 rotatable in the forward and the reverse directions fitted with a wire drum 54 onto its output shaft 53a, an elevator guide 55 fitted with an elevator 56 movable along its guide rail 55a, and a wire 57 passed round said wire drum 54 from the opposite sides. Said elevator 56 is fixed to the window glass 52 by bolts 59's, both ends of said wire 57 are fastened together in the elevator guide 55 through pulleys 60 and 61 provided rotatable at the upper and lower ends of the elevator guide 55, and said wire 57 is connected to the elevator 56.

The power window apparatus 51 is so designed that the wire 57 passed round the wire drum 54 moves between the wire drum 54 and the pulleys 60 and 61, and the elevator 56 connected with the wire 57 moves along the guide rail 55a of the elevator guide 55 by supplying electrical power to the motor 53 through a connector 62 for connecting to the power source and rotating the wire drum 54 in the forward and the reverse directions through the output shaft 53a of the motor 53, and the window glass 52 is driven in the opening and the closing directions.

However, in the afore-mentioned conventional power window apparatus 51, it is necessary to dispose the wire drum 54 connected to the motor 53 and the pulleys 60 and 61 so as to rotate practically on the same plane, therefore there is a problem since it is not possible to use said power window apparatus 51 for a door glass curved with comparatively large curvature.

SUMMARY OF THE INVENTION

The present invention is made in view of the afore-mentioned problem of the prior art and an object of the invention is to provide a power window apparatus which is possible to open and close a curved window glass having a comparatively large curvature along the curvature of said curved window glass.

The construction of the power window apparatus according to this invention for attaining the aforementioned object is characterized by a motor rotatable in the forward and the reverse directions, a curved screw having a curvature nearly equal to the curvature of a curved window glass and fixed to, for example, a housing portion of the curved window glass in parallel to the curvature of said curved window glass, and a movable unit connected to the motor and fitted onto the curved screw and moved by said motor along said curved screw with said movable unit being connected with said curved window glass.

In this case, said motor can be disposed on the side of the curved window glass together with the movable unit, however it is preferable to dispose the motor on the side of the housing portion for the curved window glass together with the curved screw and to connect said motor with the movable unit through a flexible shaft in order to decrease the weight of said curved window glass assembly.

In the power window apparatus according to this invention, the motor rotates in the forward or the reverse direction by the power supply, and the output power of the motor is transmitted to the movable unit.

Hereupon, because the curved screw fitted with the movable unit is fixed in parallel to the curvature of the curved window glass, said movable unit moves along the curved screw in the axial direction of said curved screw. Thereby, the curved window glass connected with said movable unit is so designed as to be operated smoothly in the opening or the closing direction.

DESCRIPTION OF THE PREFERRED EMBODIMENT an embodiment of the power window apparatus according to this invention will be described below on basis of drawings.

Figure 1:
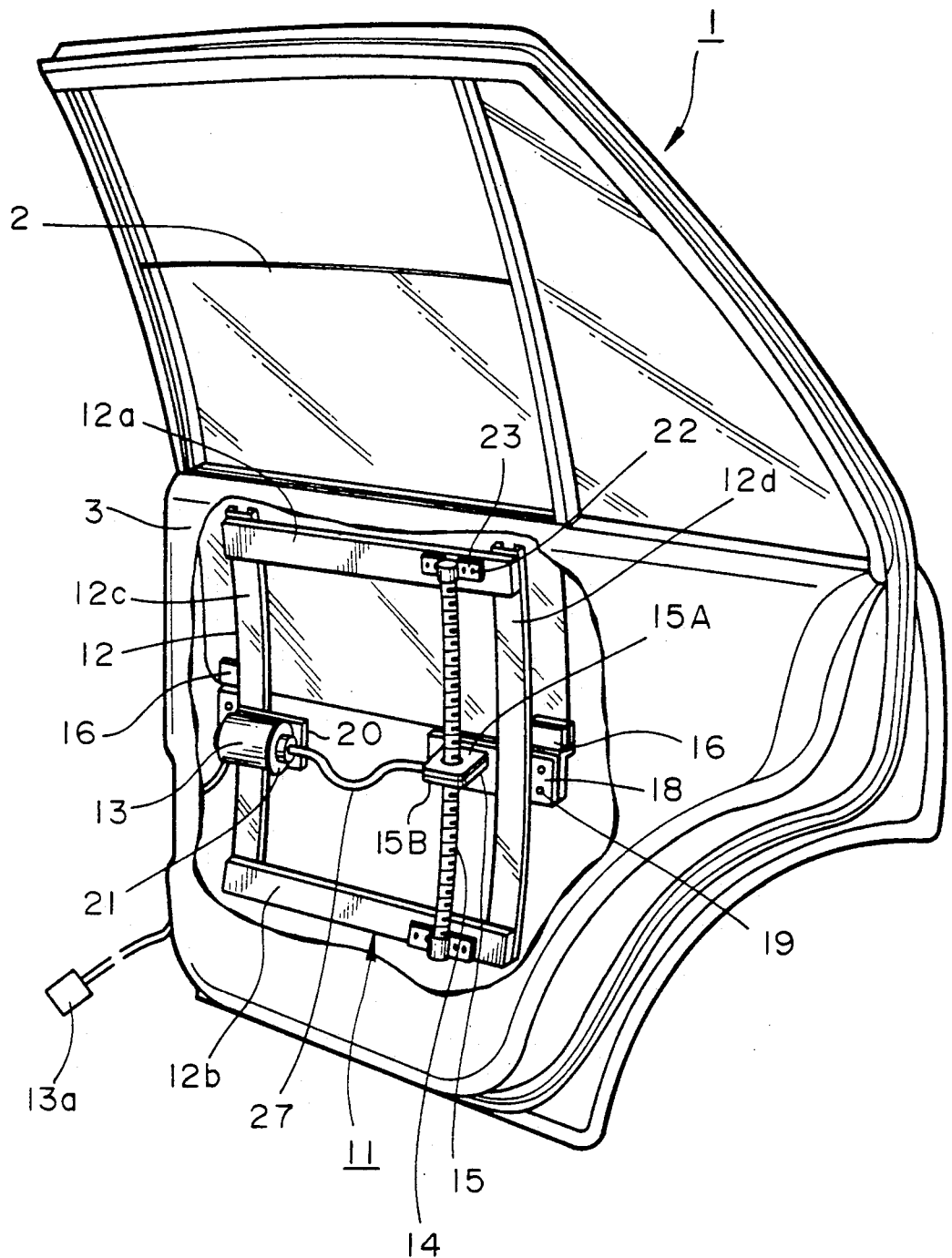
FIG. 1 is a partially cutaway perspective view illustrating a door of a motor vehicle mounted with the power window apparatus according to an embodiment of this invention for opening and closing the window glass.
Figure 2:
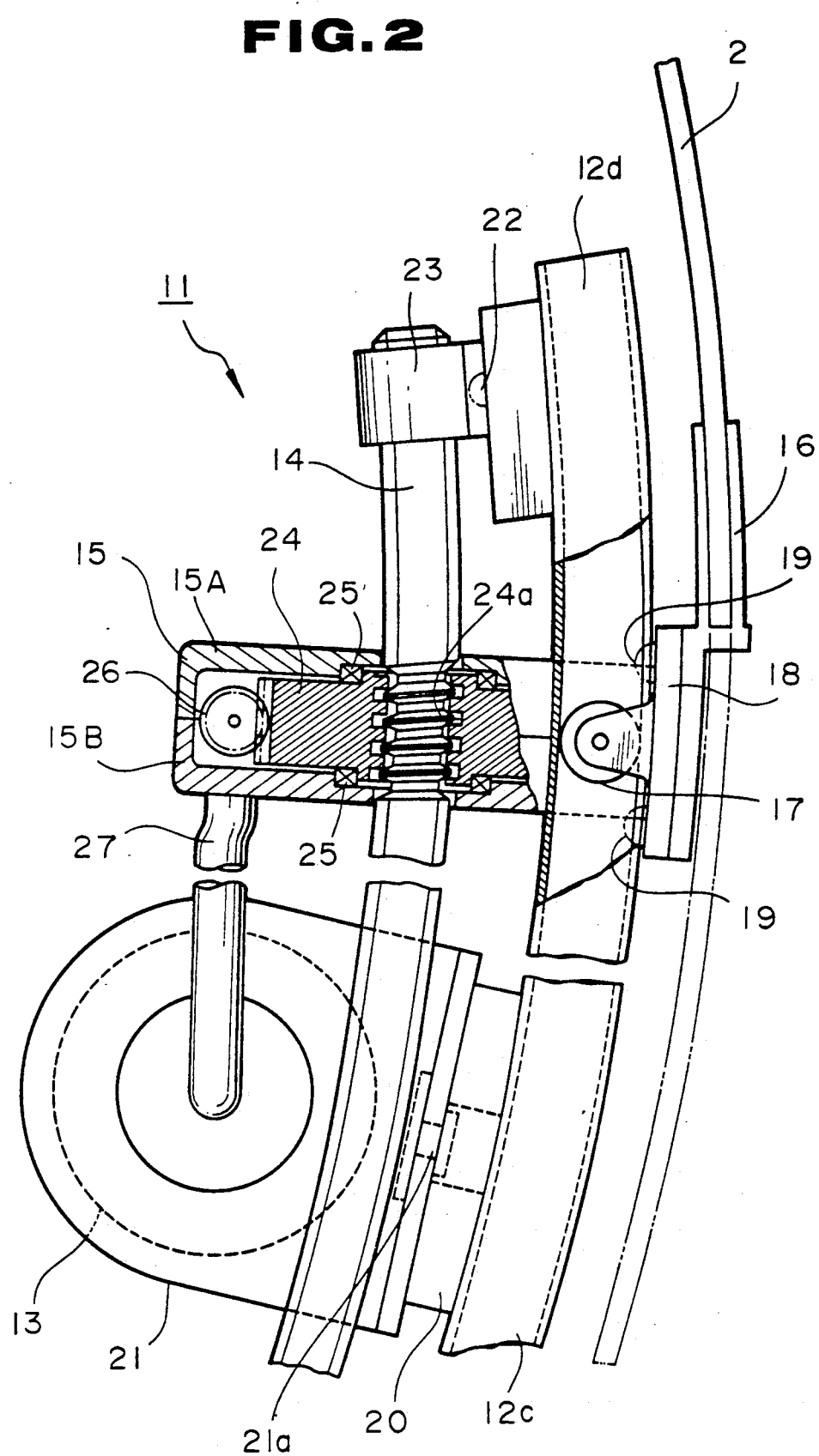
FIG. 2 is a partially enlarged rear elevation view illustrating the backside of the power window apparatus shown in FIG. 1.
Figure 3:
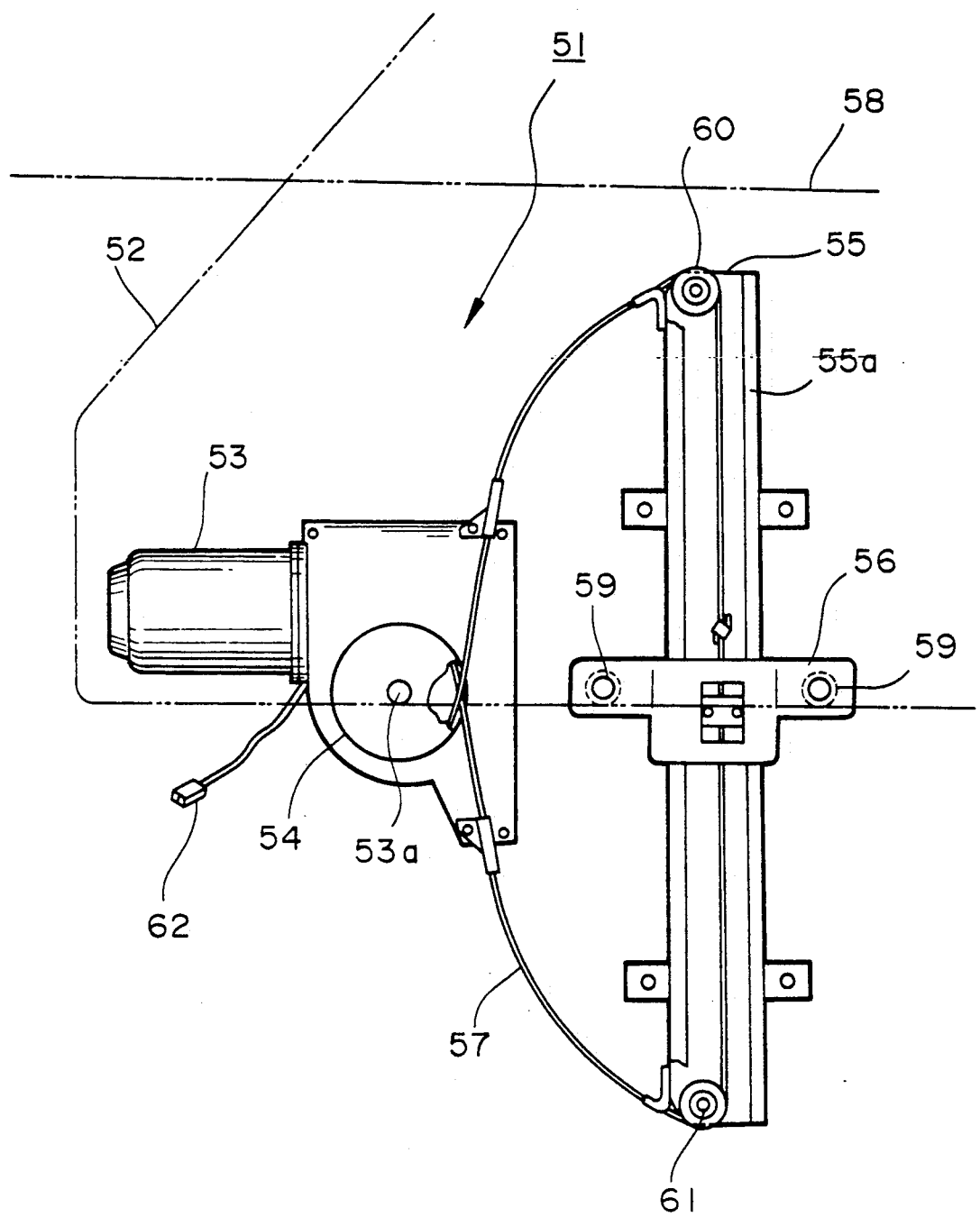
FIG. 3 is a schematic illustration showing an example of the conventional power window apparatus.

FIG. 1 and FIG. 2 show an embodiment of the power window apparatus according to this invention, and this embodiment exemplifies the case where the power window apparatus according to this invention is used for opening and closing a window glass of a motor vehicle. Furthermore, FIG. 1 shows a rear door of a sedan, and the left side in the figure corresponds to the front side of the motor vehicle.

That is, a rear door 1 shown in FIG. 1 is provided with a curved window glass 2 having a comparatively large curvature and a power window apparatus 11 for opening and closing said curved window glass 2.

Said power window apparatus 11 is provided with a frame body 12 for supporting the curved window glass 2, a motor 13 rotatable in the forward and the reverse directions, a curved screw 14 having curvature nearly equal to the curvature of the curved window glass 2, and a gear case 15 fitted onto said curved screw 14.

Said frame body 12 consists of an upper frame 12a and a lower frame 12b fixed to an inner pannel 3 through a base plate (not shown), and a front guide rail 12c and a rear guide rail 12d provided between said upper and lower frames 12a and 12b. Both of said front and rear guide rails 12c and 12d are made into curved shapes having curvature nearly equal to the curvature of the curved window glass 2. Furthermore, said guide rails 12c and 12d have nearly C-shaped sections respectively and fixed respectively to the upper and lower frame 12a and 12b in the state of directing the back faces (wide faces not opened) inwardly. Additionally, as shown in FIG. 2, a base 18 having a roller 17 is fixed with screw 19's to each glass-holder 16 fitted on the front and rear sides of the lower end of said curved door glass 2, and the roller 17 mounted on said base 18 is engaged with the inside of guide rails 12c and 12d (the rear guide rail 12d is only shown in FIG. 2). Thereby, said guide rails 12c and 12d are so made as to guide the opening and closing movements of the curved window glass 2 very smoothly.

Said motor 13 is a direct current motor rotatable in the forward and the reverse directions by operating a swith 13a, and is secured to a block 20 fixed to the middle part on the back face of the front guide rail 12c through a bracket 21. In this case, said bracket 21 is installed to the block 20 rotatable by a shaft 21a so that the motor 13 may move rotatively in a plane parallel with the frame body 12.

Said curved screw 14 is installed in the position nearer to the rear side of the upper and the lower frames 12a and 12b of the frame body 12 a position parallel with the curvature of the curved door glass 2, and is fixed by screw holders 23 fitted to the upper and the lower frames 12a and 12b with screw 22 respectively.

The gear case 15 fitted onto said curved screw 14 is formed by the combination of an upper case 15A and a lower case 15b having plane-bottomed and square-cylindrical shapes, said gear case 15 is fitted onto the curved screw 14 so that said curved screw 14 may pass through the respective center parts of the upper and the lower cases 15A and 15B.

Said gear case 15 houses a worm wheel 24 provided in the center with a female screw thread 24a made up so as to form a screw pair with the curved screw 14 in keeping a gap slightly and supported by thrust bearings 25 and 26 fitted into the center parts of respective bottoms of the upper and lower cases 15A and 15B, and a worm 26 meshed with said worm wheel 24 with, said worm 26 being connected to the motor 13 through a flexible shaft 27. The gear case 15 is connected to a part stretching toward the inside of the frame body 12 of the base 18 which is engaged with the roller 17 to the rear guide rail 12d.

Namely, said power window apparatus 11 is designed so that the output of the motor 13 may be transmitted to the worm wheel 24 certainly and the gear case 15 may be moved along the curved screw 14 in the axial direction very smoothly because the worm 26 of the gear case 15 is connected to the motor 13 through the flexible shaft 27 and the motor 13 is disposed rotatable in the plane parallel with the frame body 12 as described above. Thereby, it is possible to move the curved window glass 2 connected with the gear case 15 through the base 18 and the glass-holder 16 along the curvature of the curved window glass 2.

Next, an explanation will be given on the operation of the power window apparatus 11, having the structure as described above.

First of all, supplying the electric power to the motor 13 by operating the switch 13a, the motor 13 rotates in the forward direction (or the reverse direction), the output power of the motor 13 is transmitted to the worm 26 of the gear case 15 through the flexible shaft 27, and is further transmitted to the worm wheel 24 meshed with said worm 26.

Hereupon, since the curved screw 14 forming the screw pair with the female screw thread 24a of the worm wheel 24 is fixed between the upper and the lower frames 12a and 12b of the frame body 12 in parallel with the curvature of the curved window glass 2, the gear case 15 descends (or ascends) depending on the rotation of the worm wheel 24 due to the screw pair between the curved screw 14 and the femal screw thread 24a of the worm wheel 24 which is driven by the output power of the motor 13. The gear case 15 through the base 18 and the glass-holder 16 moves in the opening direction (or the closing direction) together with the window glass 2.

At this time, the worm 26 of the gear case 15 and the motor 13 are connected by the flexible shaft 27, the motor 13 is movable rotatively in the plane parallel with the fame body 12, therefore the descending (or the acsending) movement of the gear case 15 relative to the curved screw 14 is not obstructed.

Additionally, while the case of using the power window apparatus according to this invention for opening and closing the window glass of the motor vehicle has been exemplified in this embodiment, it is proper that the power window apparatus according to this invention can be used for opening and closing a window glass of a gymnasium, a sunroom or the like, for example.

Furthermore, the details of construction of the power window apparatus according to this invention is not restricted to the aforementioned embodiment.

As described above, the power window apparatus according to this invention comprises a motor rotatable in the forward and the reverse directions, a curved screw having curvature nearly equal to curvature of a curved window glass and fixed in parallel to the curvature of said curved window glass, a movable unit connected to the motor and fitted onto the curved screw, and moved by said motor along said curved screw, and said movable unit being connected with said curved window glass. Therefore, an excellent effect can be obtained since it is possible to open and close the curved window glass having comparative large curvature along the curvature of the curved window glass.

What is claimed is:

1. A power window apparatus for driving a curved window glass in an opening and closing direction along the curvature of said curved window glass comprising:
   support means having a curved window glass movably mounted thereon;
   a reversible motor fixedly mounted on said support means;
   a curved screw threaded rod having a curvature substantially equal to the curvature of said curved window glass and fixedly mounted on said support means in parallel with said curved window glass;
   movable means connected to said curved window glass and engaging said curved screw threaded rod for movement along said rod; and
   means connected to said motor and said movable means for driving said movable means along said curved screw threaded rod upon operation of said motor for raising and lowering said curved window glass.

2. A power window apparatus as set forth in claim 1, wherein said movable means includes a worm wheel having female screw threads engaged with said curved screw threaded rod, a worm gear connected to a flexible shaft and disposed in engagement with said worm wheel for rotating said worm wheel to move said movable means along said rod to raise and lower said curved window glass.

* * * * *